United States Patent Office 2,996,480
Patented Aug. 15, 1961

2,996,480
METHOD OF INHIBITING EXOTHERMIC REACTION IN BUTADIENE RUBBER EMULSION POLYMERIZATIONS
George B. Sterling and John F. Mulloy, Midland, Mich., assignors to The Dow Chemical Company, Midland, Mich., a corporation of Delaware
No Drawing. Filed Sept. 4, 1959, Ser. No. 838,069
10 Claims. (Cl. 260—63)

This invention concerns a method and agents for inhibiting a vigorous exothermic reaction in the emulsion polymerization of mixtures of butadiene and monoethylenically unsaturated vinylidene compounds to form synthetic rubber and relates to the making of synthetic rubber of improved softness and low gel content.

It is known that temperatures in emulsion polymerization processes are difficult to control. Usually an extremely vigorous exothermic reaction occurs upon initiating the polymerization which produces an excessive or drastic rise in the temperature at which the polymerization is carried out. By excessive temperature rise is meant an increase in temperature of over two or three degrees. It is further known that continuing the reaction until polymerization of the monomers is complete or substantially complete results in the formation of rubbers which are stiff and of high gel content. To obtain synthetic rubbers having good processibility the emulsion polymerization is usually short-stopped prior to completion by the addition of inhibitors. The addition of short-stopping agents, e.g. hydroquinone, catechol, aniline or alpha-naphthylamine, has heretofore been employed to regulate or control the exothermic polymerization temperature.

It has now been discovered that certain boron-containing compounds such as benzene boronic acid, 2-propene boronic acid, triphenyl borane, triphenyl borate, dimethylamine borane and pyridine borane or mixtures of any two or more of such boron-containing compounds are particularly effective inhibitors for preventing an excessive or drastic temperature rise in the emulsion polymerization of mixtures of butadiene and monoethylenically unsaturated vinylidine compounds to form synthetic rubbers. It has further been found that the boron-containing compounds not only inhibit the exothermic polymerization reaction which occurs upon initiating the polymerization, but that they produce little or no color change in the rubber product, and, surprisingly, produce synthetic rubbers of improved softness, and that these results are obtained even when the polymerization is carried to completion. This is most surprising since it had heretofore not been believed feasible to make synthetic rubbers of low softness, i.e. having a low Mooney number and gel content, by continuing the polymerization until complete or substantially complete.

In accordance with the present invention, the emulsion polymerization of mixtures of butadiene and monoethylenically unsaturated vinylidene compounds copolymerizable therewith to form synthetic rubbers can be controlled to regulate the exotherimc polymerization temperature and produce synthetic rubber of good color, improved softness and low gel content, even when the polymerization of the monomers is carried to completion.

The monomeric materials polymerized to produce polymers by the process of the invention comprises butadiene and monoethylenically unsaturated vinylidene compounds having a single $CH_2$—C group copolymerizable therewith to form synthetic rubbers. Among such monoethylenically unsaturated vinylidene compounds are monovinyl aromatic hydrocarbons of the benzene series, e.g. styrene, vinyltoluene, vinylxylene, isopropylstyrene, ethylvinylbenzene, tert.-butylstyrene, or nuclear halogenated monovinyl aromatic hydrocarbons of the benzene series such as chlorostyrene, dichlorostyrene, bromostyrene or fluorostyrene, or aliphatic compounds such as acrylonitrile or methyl isopropenyl ketone.

The monomeric materials can be employed in proportions corresponding to from 60 to 70 percent by weight of the butadiene and from 40 to 30 percent of one or more of the monoethylenically unsaturated other monomers. The boron-containing compound or mixture thereof is employed in amounts corresponding to form 0.5 to 2 percent by weight, based on the sum of the weights of the monomers initially used. In preparing ternary copolymers, the monomers are preferably employed in proportions corresponding to from 60 to 70 percent by weight of the butadiene and from 10 to 30 percent by weight of each of the other monomers per 100 parts by weight of the total monomers initially used.

The method of the invention is not limited to any particular initiator-activator system, but can be employed, for example, in hydroperoxide-iron complex systems, often called "redox" system, or in aqueous emulsion systems catalyzed with "per" salts such as potassium persulfate, ammonium persulfate or sodium persulfate. The polymerization can be carried out at temperatures between about 0° and 100° C., preferably from 50° to 85° C., and at superatmospheric pressure, suitably the pressure of the reaction mixture, although greater pressures can be used.

The emulsion is preferably that of the oil-in-water type with the weight ratio of the aqueous medium to monomeric material between about 1:1 to 4:1, although ratios of 10:1 can be used.

The polymerization can be carried out batchwise or in continuous or semicontinuous manner and in the presence or absence of polymerization modifiers such as a primary, secondary or tertiary mercaptan which can be an aliphatic mercaptan containing from 8 to 16 carbon atoms in the molecule.

Emulsifying agents suitable for use in practice of the invention are potassium laurate, potassium oleate, rosin acid soaps such as sodium or potassium salts of disproportionated rosin acids, sodium lauryl sulfate, mixtures of fatty acid and rosin acid soaps, or salts of alkyl aromatic sulfonic acids, e.g. sodium salt of dodecylbenzene sulfonic acid. The amount and kind of the emulsifier used to obtain optimum results is somewhat dependent upon the particular recipe used. In general, an amount of the emulsifier of from about 0.3 to 5 parts by weight per 100 parts of the monomers is sufficient, the determination of the best amount for any given recipe being within the skill of the art.

In practice, the ingredieints, i.e. the monomers, the catalyst and the aqueous solution of the emulsifying agent and the boron-containing compound, are placed in a closed pressure-resistant reaction vessel. The mixture is agitated to effect emulsification and the polymerization is carried out, usually under the pressure of the mixture of the materials at the temperatures employed, until all or substantially all of the monomers are polymerized. The polymer is recovered in usual ways, e.g. by coagulating the latex with an aqueous solution of a strong electrolyte such as aluminum sulfate, and separating, washing and drying the product.

The following examples illustrate ways in which the principle of the invention has been applied, but is not to be construed as limiting its scope.

EXAMPLE 1

In each of a series of experiments, a charge of a mixture of monomers consisting of 60 percent by weight of butadiene, 20 percent of acrylonitrile and 20 percent of methyl isopropenyl ketone was polymerized in an aqueous emulsion employing the following recipe:

| Ingredients: | Parts by weight |
|---|---|
| Butadiene | 60 |
| Acrylonitrile | 20 |
| Methyl isopropenyl ketone | 20 |
| Water | 110 |
| Duponol WAQ (fatty alcohol sodium sulfate) | 0.85 |
| Tert.-dodecyl mercaptan | 0.5 |
| Triphenyl borate | 2.0 |
| NaHCO$_3$ | 1.0 |
| K$_2$S$_2$O$_8$ | 0.75 |

The mixture was sealed in a pressure resistant glass bottle and was shaken to effect emulsification, then was placed in a water bath and heated with agitation for a period of time and at temperatures as stated in the following table. Thereafter, the bottle was removed, cooled and opened. Polymerization was short-stopped by adding 0.05 gram of a mixture of two parts by weight of dinitro-o-cresol and one part of monomethyl ether of hydroquinone to the mixture, and the polymer was recovered to determine the percent conversion. In carrying out the experiments a series of eight bottles were loaded with identical charges of the materials and all of the charged bottles were placed in the water bath at the same time. The bottles were heated at 50° C. for a period of 1.5 hours. Thereafter, the first test bottle was removed from the polymerization bath and the polymer therein was recovered as described above. The remaining seven bottles were then heated at a temperature of 60° C. A test bottle was removed at successive intervals of time as stated in the table and the polymer was recovered. The polymer recovered from the last bottle to be removed from the polymerization bath, i.e. when polymerization of the monomers was substantially complete, was mixed with 3 percent by weight of 2,4-dimethyl-6-(1-methylcyclohexyl)phenol as a stabilizing agent. This product was sheeted out on compounding rolls and test pieces were cut from the sheet. The test pieces were used to determine a Mooney number ML1+4 (212° F.) for the product.

For purpose of comparison and of showing the effect of the triphenyl borate in inhibiting the vigorous exothermic polymerization reaction which occurs in the initial stages of the polymerization, when no inhibiting agent is present, a series of eight bottles were loaded with a similar charge of materials, except that no triphenyl borate was added, and the polymerizations were carried out under time and temperature as stated in the table. Table I identifies the experiments and gives the results obtained.

*Table I*

| Run No. | With Triphenyl Borate | | | Without Triphenyl Borate | | | Run No. |
|---|---|---|---|---|---|---|---|
| | Polymerization Conditions | | Product, Yield Percent | Product, Yield Percent | Polymerization Conditions | | |
| | Time, Hrs. | Temp., °C. | | | Temp., °C. | Time, Hrs. | |
| 1 | 1.5 | 50 | 5.6 | 30.3 | 50 | 1.5 | 1a |
| 2 | 2.5 | 60 | 9.4 | 42.1 | 60 | 2.5 | 2a |
| 3 | 5 | 60 | 27.4 | 50.1 | 60 | 3.5 | 3a |
| 4 | 7 | 60 | 44.6 | 61 | 60 | 5 | 4a |
| 5 | 10 | 60 | 68.8 | 76 | 60 | 7 | 5a |
| 6 | 14 | 60 | 89.1 | 88.5 | 60 | 10 | 6a |
| 7 | 18 | 60 | 98.4 | 94 | 60 | 12 | 7a |
| 8 | 24 | 60 | 99.5 | 98 | 60 | 14.5 | 8a |

The product from run 8 had a gel content of 70.4 percent and a Mooney ML1+4 (212° F.) of 81. The product from run 8a had a gel content of 72.3 percent and a Mooney ML1+4 (212° F.) of 106.

EXAMPLE 2

A charge of 50 pounds of a mixture of monomers consisting of 60 percent by weight of butadiene, 20 percent of acrylonitrile and 20 percent of methyl isopropenyl ketone, was placed in a 50 gallon pressure resistant vessel, together with 55 pounds of an aqueous solution, containing based on the weight of the monomers, 0.85 percent of Duponol WAQ (fatty alcohol sodium sulfate) emusifying agent, 0.5 percent of tert.-dodecyl mercaptan, 2 percent of triphenyl borate, 1 percent of sodium bicarbonate and 0.75 percent of potassium persulfate. The mixture was agitated by rotating the stirrer at 90 r.p.m. and was heated to a temperature of 50° C. for a period of 1.5 hours then was heated at 60° C. until polymerization of the monomers was completed. Test portions of the mixture were withdrawn from the vessel at successive intervals. The test portions were short-stopped by adding thereto 0.05 gram of a mixture of two parts by weight of dinitro-o-cresol and one part of monomethyl ether of hydroquinone, to terminate the polymerization, then were coagulated or analyzed to determine the percent of polymerization or conversion. Table II identifies the test portions and gives the polymerization time and temperature conditions after which the test portion was withdrawn from the vessel. The polymerization was mildly exothermic in the initial stages, but was readily controlled.

*Table II*

| Test No. | Time, Hrs. | Temp., °C. | Conversion, Percent |
|---|---|---|---|
| 1 | 1.5 | 50 | 7 |
| 2 | 4 | 60 | 29.4 |
| 3 | 6 | 60 | 51 |
| 4 | 8 | 60 | 53.5 |
| 5 | 11 | 60 | 64.5 |
| 6 | 15 | 60 | 83 |
| 7 | 29.5 | 60 | 100 |

The copolymer product had a gel content of 73 percent and a Mooney ML1+4 (212° F.) of 81.

EXAMPLE 3

In each of a series of experiments, a charge of a mixture of monomers consisting of 60 percent by weight of butadiene, 20 percent of acrylonitrile and 20 percent of methyl isopropenyl ketone, together with a boron-containing compound in kind and amount as stated in the following table, was polymerized by heating the same in a closed container at a temperature of 60° C. for a period of one hour, employing a recipe similar to that employed in Example 1. Table III identifies the experiments and gives the percent conversion of the monomers to polymer.

For purpose of comparison, a similar experiment was carried out with no inhibiting agent present and the result included in the table.

*Table III*

| Run No. | Test Material | Concentration in percent on Monomers | Percent Conversion |
|---|---|---|---|
| 1 | None | | 40.8 |
| 2 | Triphenyl Borane | 0.5 | 34.8 |
| 3 | do | 1.0 | 25.4 |
| 4 | do | 2.0 | 20.0 |
| 5 | Benzene boronic acid | 0.1 | 38.6 |
| 6 | do | 0.2 | 32.0 |
| 7 | do | 0.3 | 29.4 |
| 8 | 2-Propene boronic acid | 0.5 | 35.0 |
| 9 | do | 2.0 | 19.4 |
| 10 | Dimethylamine borane | 0.5 | 32.8 |
| 11 | do | 2.0 | 18.1 |
| 12 | Pyridine borane | 0.5 | 30.0 |
| 13 | do | 2.0 | 24.0 |

EXAMPLE 4

A mixture of monomers consisting of 60 percent by weight of butadiene, 20 percent of acrylonitrile and 20 percent of styrene was placed in a pressure resistant glass bottle together with an aqueous solution and an amount of triphenyl borate as stated in the following table. The mixture was polymerized in aqueous emulsion, employing a recipe similar to that employed in Example 1, by heating the same at a temperature of 60° C. for one hour. Thereafter the polymer was recovered to determine the percent conversion. Table IV identifies the experiments and gives the proportion of the triphenyl borate employed in the reaction and the percent of polymer obtained, based on the weight of the monomers initially used.

Table IV

| Run No. | Test Material | Concentration in percent on Monomers | Percent Conversion |
|---|---|---|---|
| 1 | None | | 25 |
| 2 | Triphenyl Borate | 0.5 | 8 |
| 3 | ----do---- | 2 | 2.5 |

Similar results were obtained when a mixture of 60 percent by weight of butadiene, 20 percent of methyl isopropenyl ketone and 20 percent of styrene was polymerized under the same conditions.

EXAMPLE 5

A mixture of monomers consisting of 70 percent by weight of butadiene and 30 percent of acrylonitrile was polymerized in an aqueous emulsion at 60° C. for one hour employing a procedure similar to that employed in Example 4. Table V identifies the experiments and gives the results obtained.

Table V

| Run No. | Test Material | Concentration in percent on Monomers | Percent Conversion |
|---|---|---|---|
| 1 | None | | 34.5 |
| 2 | Triphenyl Borate | 0.5 | 27.0 |
| 3 | ----do---- | 2.0 | 6.0 |

Similar results were obtained when a mixture of 70 percent by weight of butadiene and 30 percent of methyl isopropenyl ketone was polymerized under the same conditions.

We claim:

1. In the emulsion polymerization of a mixture of polymerizable organic compounds comprising butadiene to form a synthetic rubber under the action of a polymerization catalyst, a method of inhibiting a vigorous exothermic polymerization reaction and producing a rubbery copolymer of good color and improved softness, which method comprises carrying out the oil-in-water type aqueous emulsion polymerization of a mixture of monomers consisting essentially of from 60 to 70 percent by weight of butadiene and from 40 to 30 percent of at least one of the monomers selected from the group consisting of acrylonitrile, styrene, vinyltoluene, dichlorostyrene and methyl isopropenyl ketone, in admixture with from 0.5 to 2 percent of a boron-containing compound of the group consisting of benzene boronic acid, triphenyl borane, triphenyl borate, 2-propene boronic acid, dimethylamine borane and pyridine borane, based on the weight of the polymerizable monomers initially used.

2. A process as claimed in claim 1, wherein the polymerization is carried out at temperatures between 0° and 100° C. until polymerization of the monomers is substantially complete.

3. A process as claimed in claim 2, wherein the polymerizable organic compounds are a mixture of from 60 to 70 percent by weight of butadiene and from 40 to 30 percent of acrylonitrile.

4. A process as claimed in claim 1, wherein the polymerizable organic compounds are a mixture of from 60 to 70 percent by weight of butadiene, from 10 to 30 percent of acrylonitrile and from 10 to 30 percent of methyl isopropenyl ketone per 100 parts by weight of said organic compounds.

5. A process as claimed in claim 1, wherein the boron-containing compound is triphenyl borate.

6. A process as claimed in claim 1, wherein the boron-containing compound is triphenyl borane.

7. A process as claimed in claim 1, wherein the boron-containing compound is benzene boronic acid.

8. A process as claimed in claim 1, wherein the boron-containing compound is 2-propene boronic acid.

9. A process as claimed in claim 1, wherein the boron-containing compound is dimethylamine borane.

10. A process as claimed in claim 1, wherein the boron-containing compound is pyridine borane.

References Cited in the file of this patent

UNITED STATES PATENTS 2,515,686    Barnes et al. _____ July 18, 1950